United States Patent [19]

Zeman

[11] Patent Number: 5,334,843
[45] Date of Patent: Aug. 2, 1994

[54] COMPOSITE SCINTILLATOR SCREEN

[76] Inventor: Herbert D. Zeman, 1687 Peach St., Memphis, Tenn. 38112

[21] Appl. No.: 931,020

[22] Filed: Aug. 17, 1992

[51] Int. Cl.$^5$ .............................................. G21K 4/00
[52] U.S. Cl. ................... 250/486.1; 250/483.1
[58] Field of Search ................ 250/483.1, 486.1; 428/690; 378/37

[56] References Cited

U.S. PATENT DOCUMENTS

| | | | |
|---|---|---|---|
| 3,872,309 | 3/1975 | De Belder et al. | 250/483.1 |
| 3,936,644 | 2/1976 | Rabatin | 250/486.1 |
| 4,088,508 | 5/1978 | Gravisse | 250/486.1 |
| 4,247,774 | 1/1981 | Brooks | 250/367 |
| 4,256,965 | 3/1981 | Lucian | 250/483.1 |
| 4,431,922 | 2/1984 | Patten | 250/486.1 |
| 4,511,799 | 4/1985 | Bjorkholm | 250/367 |
| 4,513,078 | 4/1985 | Sandrik et al. | 250/486.1 |
| 4,529,647 | 7/1985 | Maeoka et al. | 250/486.1 |
| 4,626,688 | 12/1986 | Barnes | 250/486.1 |
| 4,709,382 | 11/1987 | Sones | 378/62 |
| 4,820,926 | 4/1989 | Popma et al. | 250/486.1 |
| 4,870,667 | 9/1989 | Brunnett et al. | 250/367 |
| 4,933,562 | 6/1990 | Roziere | 250/486.1 |
| 5,025,163 | 6/1991 | Jeffers | 250/483.1 |

FOREIGN PATENT DOCUMENTS 1258200  11/1986  Japan ........................ 250/486.1

*Primary Examiner*—Carolyn E. Fields
*Attorney, Agent, or Firm*—Leudeka, Neely & Graham

[57] ABSTRACT

A scintillator screen for an X-ray system includes a substrate of low-Z material and bodies of a high-Z material embedded within the substrate. By preselecting the size of the bodies embedded within the substrate, the spacial separation of the bodies and the thickness of the screen, the sensitivity of the screen to X-rays within a predetermined energy range can be predicted.

17 Claims, 1 Drawing Sheet

COMPOSITE SCINTILLATOR SCREEN

The Government has rights in this invention pursuant to DOE Contract No. DE-FG03-87ER60527.

BACKGROUND OF THE INVENTION

This invention relates generally to X-ray diagnostic systems and relates, more particularly, to a scintillator screen used in such a system.

During use of a diagnostic X-ray system, a scintillator screen is disposed in the path of an X-ray beam on the side of a patient opposite the X-ray source. The scintillator screen produces light in response to a pattern of X-rays impinging upon the screen, and the produced light can be 1) used to expose a film supported adjacent the screen, 2) produce photoelectrons which can then be accelerated in an electric field to strike a second scintillating screen, as in an X-ray image intensifier, or 3) be focused with a lens onto a CCD or other TV camera system for digital image recording.

It would be desirable in some X-ray applications, such as intravenous coronary angiography using K-emission X-rays produced by high energy electron bombardment of high-Z anode materials, to provide a scintillator screen with a reduced sensitivity to X-rays within a preselected energy range. For example, in intravenous coronary angiography during which X-rays are directed through a patient and onto a scintillator screen, it would be desirable to control or limit the amount of light generated in the screen by the higher energy X-rays.

Accordingly, it is an object of the present invention to provide a new and improved scintillator screen for an X-ray diagnostic system having a predetermined sensitivity to X-rays within a preselected energy range.

Another object of the present invention is to provide such a screen which is well-suited for use in a dual-energy screen assembly with which X-rays within one energy range can be distinguished from X-rays within another energy range.

This invention resides in a scintillator screen for an X-ray system comprised of a substrate of low-Z material and bodies associated with the substrate including a high-Z material. At least one of the materials of the bodies and substrate is adapted to scintillate upon exposure to photoelectrons produced by X-rays passing through the high-Z material of the bodies, and the bodies are of such size and are spacially separated from one another by the low-Z material of the substrate to provide the screen with a predetermined sensitivity to X-rays within a preselected energy range.

DETAILED DESCRIPTION OF THE ILLUSTRATED EMBODIMENTS

Figure 1:
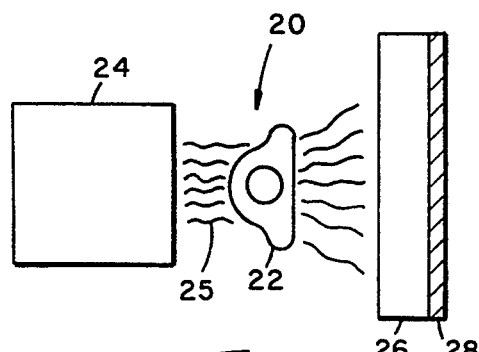
FIG. 1 is a plan view illustrating schematically an X-ray system within which a scintillation screen is utilized.

Turning now to the drawings in greater detail, there is illustrated in FIG. 1 an X-ray system, generally indicated 20, used for obtaining an X-ray image through a patient 22. The system 20 includes a source 24 for an X-ray beam 25, a scintillator screen 26 and an X-ray film 28 supported adjacent the screen 26. The patient is positioned generally between the source 24 and screen 26 so that the screen 26 is exposed to patterns in the X-rays after the beam 25 passes through the body of the patient 22. The screen 26, in turn, produces light patterns in response to the X-ray patterns impinging thereon and exposes the film 28 in accordance with the light patterns.

Figure 2:
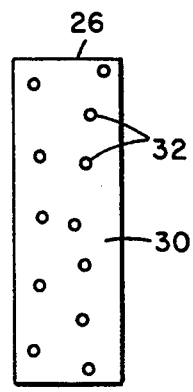
FIG. 2 is a transverse cross-sectional view of the scintillation screen of FIG. 1.

The screen 26 of the system 20 is adapted to produce a distinct and clear pattern of light in response to the X-rays of the beam 25 within the desired diagnostic energy range but is also adapted to have a reduced sensitivity to higher energy X-rays of the beam 25. For example, for intravenous angiography with a ytterbium contrast agent, the X-rays within the diagnostic range are those X-rays near in energy to the K-edge of ytterbium at 61.332 keV and the higher energy X-rays to which the screen 26 has a reduced sensitivity are the high energy Bremsstrahlung produced by the high energy electrons used to produce the K-emission lines at high yield. To this end and with reference to FIG. 2, the screen 26 includes a self-supportive substrate 30 comprised of a low-Z non-scintillating material and small bodies 32, in the form of grains, of a high-Z scintillator material associated with the substrate 30.

In the interests of this invention, a low-Z material is defined as a material with e very low absorption of X-rays in the diagnostic energy range, while a high-Z material is a material with a high absorption of X-rays in the diagnostic energy range. An example of a non-scintillating low-Z material suitable for use as the substrate 30 is lithium fluoride (LiF), and example of a high-Z scintillator suitable for use as the grains 32 is barium fluoride ($BaF_2$).

For the intravenous angiography example, the grains 32 are provided by grains of $BaF_2$, each having a diameter of about 10 microns, uniformly dispersed throughout the LiF substrate 30 and so as to occupy about 25% of the volume of the screen 26. By preselecting the volume of uniformly-dispersed $BaF_2$ grains in a unit volume of substrate, the grains 32 are spatially separated from one another by a predetermined amount. Such a screen 26 would produce almost the same amount of light per X-ray photon as a pure $BaF_2$ screen at 61 keY, but would produce less than half the amount of light per X-ray photon as a pure $BaF_2$ screen at 200 keV.

Grains of BaF and a substrate of LiF provide another advantage which relates to the indices of refraction and melting temperatures of the materials. More specifically, these materials have similar indices of refraction (i.e., n=1.3915 for LiF and n =1.4741 for $BaF_2$) so that the refraction of light at the boundaries between the two materials is not appreciable. Moreover, $BaF_2$ melts at about 1355° C. while LiF melts at about 845° C. so that grains of BaF$_2$, can each remain in a solid state and thus retain its shape while suspended in molten LiF. Such an advantage can be appreciated when constructing the screen 26 in a molding operation with heated LiF.

During use of the depicted screen 26, the high-Z grains absorb X-rays impinging thereon and produce photoelectrons in accordance with the photoelectric effect wherein the energy of the produced photoelectrons equals the energy of the absorbed X-ray minus the binding energy of the electron. Hence, higher energy X-rays produce higher energy photoelectrons, and the higher energy photoelectrons travel a further distance through the scintillation material before stopping than do the lower energy photoelectrons.

With a higher energy X-ray beam, the mass attenuation coefficient for X-ray photons with increasing energy naturally causes a reduction in the fraction of X-rays absorbed by the screen.

Further, because the high-Z grains are relatively small, the photoelectrons produced by high energy X-rays impinging upon the grains are likely to pass out of the grains before the photoelectrons produce all of the light which would otherwise be produced if all of the energy of the photoelectrons were dissipated within the grains. Accordingly, if the size of the grains of high-Z material is small enough, photoelectrons produced by the higher energy X-rays pass out of the grains without producing a significant amount of scintillation light. It follows that by controlling or preselecting the size of the high-Z grains, the light output of the screen 26 per photon can be predicted. Moreover, the reduction of the thickness of the screen 26, as measured between the front and back of the screen, also serves to further reduce the light output of the screen because the amount of high-Z material per unit area of the front of the screen capable of absorbing X-rays will be reduced. Accordingly, by controlling or preselecting the size of the grains 32 of high-Z material, the spacial separation of the grains 32 and the thickness of the screen 26, the light output of the screen 26 can be predicted as a function of the energy level of the X-rays. Similarly, a screen 26 providing a preselected light output versus energy at a preselected energy value can be constructed by incorporating within the screen 26 grains of a preselected size and providing the screen with a predetermined thickness and a predetermined amount of grain material per unit volume of the screen 26.

Figure 3:
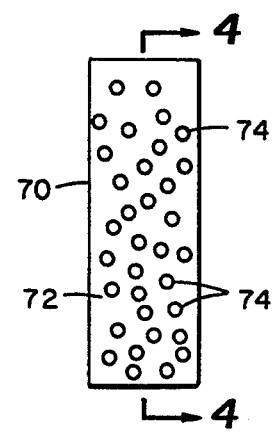
FIG. 3 is a view similar to that of FIG. 2 of an alternative scintillation screen.
Figure 4:
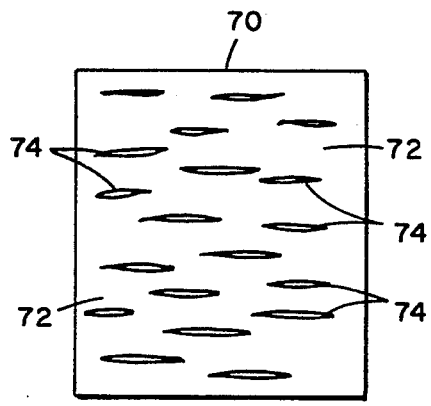
FIG. 4 is a cross-sectional view taken about along line 4—4 of FIG. 3.

Although the bodies 31 of a high-Z material of the screen 26 have been shown and described above as being in the form of grains 32 embedded within the substrate 30, such bodies may be provided in alternative forms. For example and as shown in FIGS. 3 and 4, there is shown a screen 70 having a substrate 72 of LiF and a plurality of fibers 74 comprised of BaF$_2$. The BaF$_2$ fibers 74 are uniformly dispersed throughout the substrate 72 and are arranged therein so that each fiber 74 is oriented generally perpendicular to the expected path of travel of X-rays through the screen 70. Consequently the distance through each fiber 74 (corresponding to its thickness, or diameter) that an X-ray is expected to travel before exiting the fiber 74 is relatively small. Preferably, the thickness of each fiber 74 is between about $1 \times 10^{-3}$ mm and $1 \times 10^{-2}$ mm.

Figure 5:
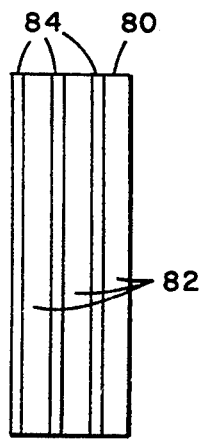
FIG. 5 is a view similar to that of FIG. 2 of another alternative scintillation screen.

Still further, there is shown in FIG. 5 a screen 80 having a layered substrate 82 of LiF and a plurality of layers 84 of BaF$_2$ interposed between adjacent layers 82 of substrate. In the screen 80, each layer 84 of BaF$_2$ is about one-fourth the thickness of an adjacent layer 82 of LiF substrate so as to provide the screen 80 with a predetermined amount (i.e., 25%) of BaF$_2$ per unit volume of substrate material. More specifically, each layer 84 is about 10 microns in thickness.

Figure 6:
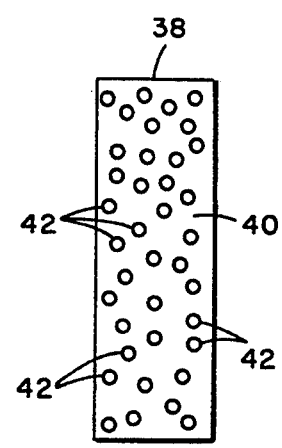
FIG. 6 is a view similar to that of FIG. 2 of still another alternative scintillation screen.

With reference to FIG. 6, there is illustrated a screen 38 which is sensitive only to higher energy X-rays. To this end, the screen 38 includes a substrate 40 comprised of a low-Z scintillating material, e.g. anthracene ($C_{14}H_{10}$), within which grains or fibers 42 of transparent non-scintillating high-Z material, e.g. heavy flint glass containing about 48 percent by weight PbO, are embedded. In use, a low energy X-ray photoelectrically absorbed in the grain of fiber 42 comprised of heavy flint glass will produce a photoelectron which, on the average, never passes out of the grain or fiber 42 and produces no light. Conversely, a high energy X-ray absorbed in the grain or fiber 42 will produce a photoelectron with sufficient energy to always be able to reach the scintillating substrate 40 and produce light. Hence, such a composite screen 38 will preferentially detect high energy X-rays. The choice of heavy flint glass for the grains and anthracene for the substrate provides an advantage in that the composition of the glass can be adjusted so that the index of refraction of the glass exactly equals that of anthracene (1.62) yielding a minimum of light refraction at the boundaries between the two materials.

Figure 7:
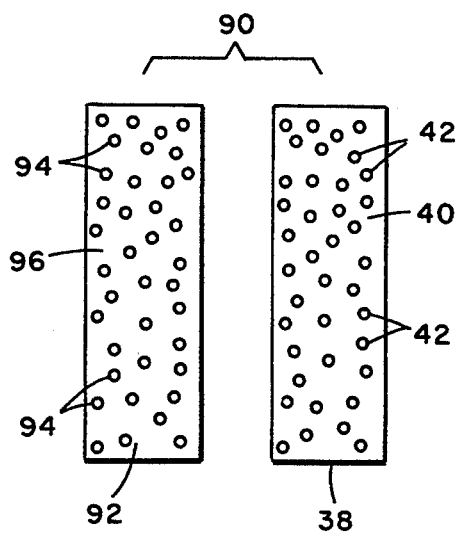
FIG. 7 is a view similar to that of FIG. 2 of yet still another alternative scintillation screen.

One possible application of the aforedescribed screen 38 of FIG. 6 would be as part, or one layer, of a dual-energy mammographic intensifying screen indicated 90 in FIG. 7. The screen 38 would be used to separate the 18 key Mo K-lines from the $\approx 36$ keV Bremsstrahlung produced when the Mo anode tube (not shown) is operated at 49 kVp with Mo filtration. Another layer, indicated 92, of the dual-energy screen 90 might be a composite intensifying screen consisting of grains 94 ($\approx 1.6$ micron diameter) of gadolinium oxysulphide embedded in a NE-102 plastic scintillator substrate 96. In this low energy screen layer 92, the photoelectron produced by the 18 keV Mo K-lines would stop in the gadolinium oxysulphide grains 94 and emit green light. The higher energy 36 keV Bremsstrahlung X-rays would deposit some energy in the gadolinium oxysulphide grains 94, but would deposit more energy in the NE-102 plastic scintillator substrate material and emit blue light.

The layer of the screen 90 provided by the aforedescribed flint glass/anthracene screen 38 is positioned adjacent the screen 92 to detect the higher energy Bremssgtrahlung around 36 keV. By utilizing flint glass grains or fibers 42 of about 1.6 microns in diameter within the anthracene substrate 40, which substrate 40 emits blue light in response to the movement of a photoelectron therethrough, the screen 38 could be made totally insensitive to the Mo K-lines, while having significant sensitivity to 36 keV Bremsstrahlung. Thus, this dual-energy screen 90 would emit, by means of the screen layer 92, green light associated with the Mo K-lines and would emit, by means of the screen layer 38, blue light associated with the 36 keV Bremsstrahlung so that both screen layers 38, 92 contribute to this dual-energy effect. The two colors of light could be detected by two different CCD TV cameras (not shown) coupled to the dual-energy screen 90 with two lenses and a dichroic mirror (or a beam splitter mirror and two filters).

Figure 8:
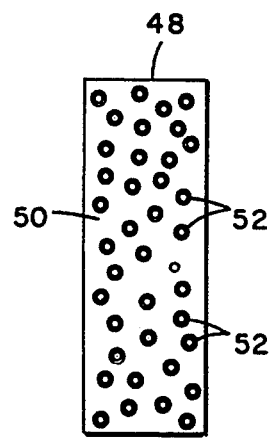
FIG. 8 is a view similar to that of FIG. 2 of one more alternative scintillation screen.
Figure 9:
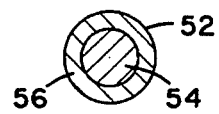
FIG. 9 is a cross-sectional view of a ball embedded within the screen of FIG. 8.

With reference to FIG. 8, there is illustrated a composite scintillator screen 48 adapted to be sensitive only to X-rays of an intermediate energy and, consequently, insensitive to both very low and very high energy X-rays. The screen 48 includes a substrate 50 of a non-scintillating plastic having balls 52 embedded within a substrate 50 of low-Z material. As best shown in FIG. 9, each ball 52 includes a core 54 of non-scintillating leaded, high-Z plastic and a shell 56 or coating of scintillating plastic covering the core 54. During use of the screen 48, very low energy X-rays incident upon the screen 48 will produce photoelectrons which never get out of the leaded core 54, and very high energy X-rays produce photoelectrons which pass through the scintillating shell 54 before giving up all their energy. By comparison, X-rays in an intermediate energy range will produce photoelectrons which will reach the scintillating shell 56 of the balls 52 and give up most of their energy there. Thus, the screen 48 has its greatest detection efficiency for X-rays of an intermediate energy.

It will be understood that numerous modifications and substitutions may be had to the aforedescribed embodiments without departing from the spirit of the invention. For example, there exists several low-Z materials and high-Z materials other than ones mentioned earlier which may be used in screens embodying the principles of the present invention. Accordingly, the aforedescribed embodiments are intended for the purpose of illustration and not as limitation.

I claim:

1. A scintillator screen for an X-ray system comprising:
   a substrate of low-Z, non-scintillating material; and
   bodies associated with the substrate including a high-Z, scintillating material adapted to scintillate upon exposure to photoelectrons produced by X-rays passing through the high-Z material of the bodies, the bodies being of such size and being spatially separated from one another by the low-Z material of the substrate to provide the screen with a predetermined sensitivity to X-rays within a preselected energy range.

2. A screen as defined in claim 1 wherein the bodies are dispersed uniformly throughout the substrate.

3. A screen as defined in claim 1 wherein the materials of the substrate and the bodies have indices of refraction which are within ten percent of each other.

4. A screen as defined in claim 1 wherein each of the bodies has a thickness between about $1 \times 10^{-3}$ mm and $1 \times 10^{-2}$ mm as measured in a direction therethrough which corresponds generally to the direction of travel of an X-ray into the bodies.

5. The screen as defined in claim 1 wherein the bodies are provided by grains embedded within the substrate.

6. A screen as defined in claim 5 wherein the high-Z material of the bodies comprises about 25% of the total volume of the screen.

7. The screen as defined in claim 1 wherein at least one of the bodies is provided by a layer of high-Z material juxtaposed with the substrate material.

8. A screen as defined in claim 7 wherein the high-Z material of the bodies comprises about 25% of the total volume of the screen.

9. A screen as defined in claim 1 wherein the high-Z material of the bodies comprises about 25% of the total volume of the screen.

10. A screen as defined in claim 1 wherein the bodies include gadolinium oxysulphide and the substrate includes plastic.

11. The screen of claim 1 further comprising:
    a second substrate positioned adjacent said first substrate, said second substrate including low-Z material; and
    second bodies associated with the second substrate including high-Z material, at least one of said second substrate and said second bodies being adapted to scintillate upon exposure to photoelectrons provided by X-rays passing through the high-Z material of said second bodies, said second bodies being of such a size and being spatially separated one from another by the low-Z material of said second substrate to provide a pre-selected sensitivity to X-rays within an alternative energy range.

12. A scintillator screen for an X-ray system comprising:
    a substrate of low-Z material; and
    bodies comprised of fibers associated with the substrate including a high-Z material, at least one of the materials of the substrate and bodies adapted to scintillate upon exposure to photoelectrons produced by X-rays passing through the high-Z material of the bodies, the bodies being of such size and being spatially separated from one another by the low-Z material of the substrate to provide the screen with a predetermined sensitivity to X-rays within a preselected energy range.

13. A screen as defined in claim 12 wherein the high-Z material of the bodies comprises about 25% of the total volume of the screen.

14. A scintillator screen for an X-ray system comprising:
    a substrate including lithium fluoride; and
    bodies associated with the substrate including barium fluoride, the bodies being of such size and being spatially separated from one another by the lithium fluoride of the substrate to provide the screen with a predetermined sensitivity to X-rays within a preselected energy range.

15. A scintillator screen for an X-ray system comprising:
    a substrate including anthracene; and
    bodies associated with the substrate including heavy flint glass, the bodies being of such size and being spatially separated from one another by the anthracene of the substrate to provide the screen with a predetermined sensitivity to X-rays within a preselected energy range.

16. A scintillator screen for an X-ray system comprising:
    a substrate of low-Z material; and
    bodies associated with the substrate including a quantity of leaded plastic coated with a low-Z material, at least one of the materials of the substrate and bodies adapted to scintillate upon exposure to photoelectrons produced by X-rays passing through the bodies, and the bodies are of such size and are spatially separated from one another by the low-Z material of the substrate to provide the screen with a predetermined sensitivity to X-rays within a preselected energy range.

17. A scintillator screen for an X-ray system comprising:
    a substrate including lithium fluoride and
    bodies associated with the substrate including barium fluoride, the bodies having a thickness of about 10 microns as measured in a direction therethrough which corresponds generally to the direction of travel of an X-ray into the body, the bodies being uniformly dispersed throughout the substrate and occupying about 25% of the total volume of the screen, and the bodies being of such size and being spatially separated from one another to provide the screen with a predetermined sensitivity to X-rays within a preselected energy range.

* * * * *

UNITED STATES PATENT AND TRADEMARK OFFICE
CERTIFICATE OF CORRECTION

PATENT NO. : 5,334,843
DATED : August 2, 1994
INVENTOR(S) : Herbert D. Zeman

It is certified that error appears in the above-indentified patent and that said Letters Patent is hereby corrected as shown below:

Column 2, line 41

After "with", delete "e" and insert --a-- therefor.

Column 2, line 58

Delete "keY" and insert --keV-- therefor.

Column 2, line 61

Delete "BaF" and insert --BaF$_2$-- therefor.

Column 4, line 33

Delete "key" and insert --keV-- therefor.

Signed and Sealed this

Fourth Day of October, 1994

Attest:

BRUCE LEHMAN

Attesting Officer      Commissioner of Patents and Trademarks